June 25, 1963 R. S. FLEMING 3,094,707
COMBINATION TOILET AND CHEMICAL TREATING FACILITY
Filed Jan. 10, 1961 4 Sheets-Sheet 1

INVENTOR.
ROBERT S. FLEMING
BY
Paul M. Phillips
ATTORNEY

June 25, 1963 R. S. FLEMING 3,094,707
COMBINATION TOILET AND CHEMICAL TREATING FACILITY
Filed Jan. 10, 1961 4 Sheets-Sheet 2

INVENTOR.
ROBERT S. FLEMING
BY
Paul M. Phillips
ATTORNEY

June 25, 1963 R. S. FLEMING 3,094,707
COMBINATION TOILET AND CHEMICAL TREATING FACILITY
Filed Jan. 10, 1961 4 Sheets-Sheet 3

INVENTOR.
ROBERT S. FLEMING
BY
Paul M. Phillips
ATTORNEY

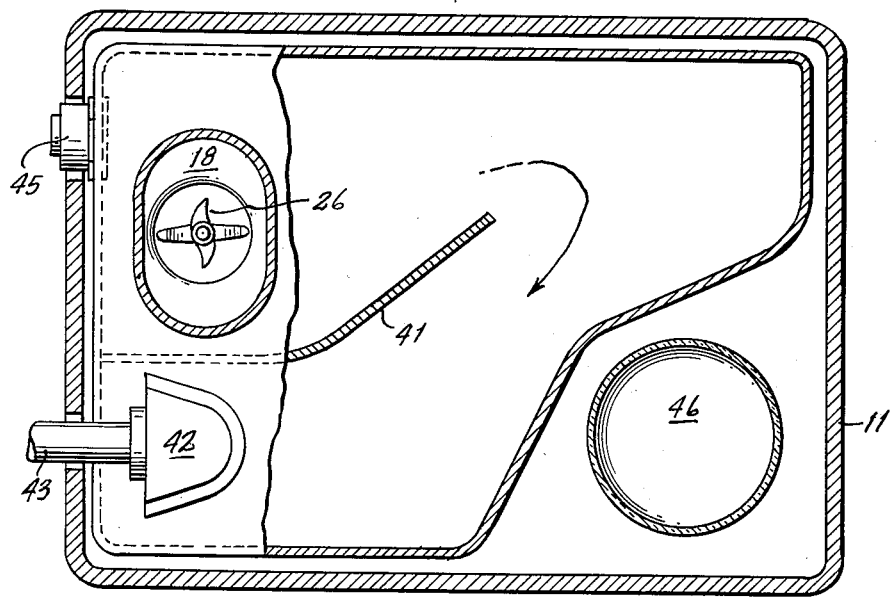
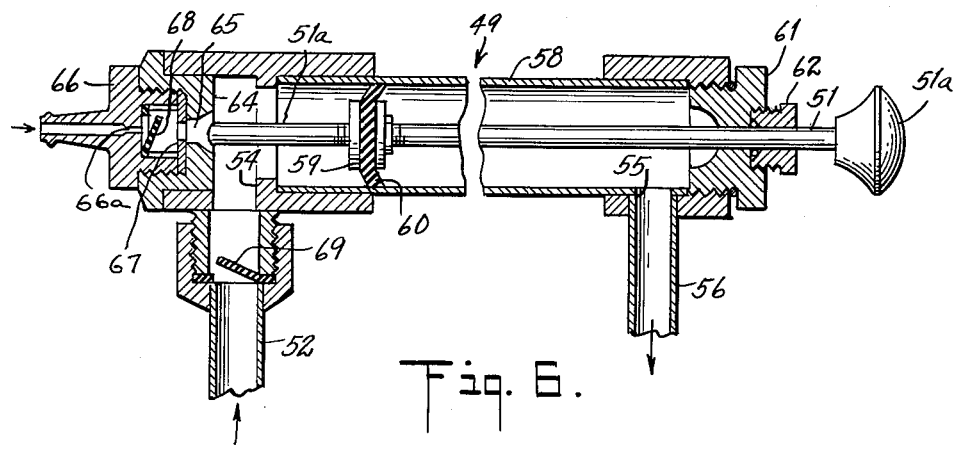

United States Patent Office 3,094,707
Patented June 25, 1963

3,094,707
COMBINATION TOILET AND CHEMICAL TREATING FACILITY
Robert S. Fleming, Pompton Plains, N.J., assignor to Amerace Corporation, New York, N.Y., a corporation of Delaware
Filed Jan. 10, 1961, Ser. No. 81,848
1 Claim. (Cl. 4—77)

This invention relates to a combination toilet and chemical treating facility. More particularly, this invention relates to a compact, self-contained toilet and chemical treating facility capable of receiving and treating human waste materials. Still more particularly, this invention relates to a combination toilet and chlorinator facility capable of receiving and chlorinating human waste materials, and then discharging the resulting treated materials, such as discharging the treated materials below the surface of a receiving body of water or into a suitable receptacle.

Because of the large number of marine pleasure craft operating in inland and coastal bodies of water, such as lakes, rivers, inlets and streams, the pollution of these waters due to the discharge of waste materials, particularly human waste materials, from such craft has become a problem. As a result, pollution control measures have been instituted by governmental control agencies to avoid and abate pollution in such waters. These pollution control measures usually call for treating waste materials, such as human waste materials, to reduce the same to a finely-divided, substantially fluent state, to remove offendin odors therefrom and to destroy bacteria and the like therein.

It is an object of this invention to provide a compact, combination toilet and chemical treating facility.

It is another object of this invention to provide a compact, combination marine toilet and a chlorinator therefor.

Another object of this invention is to provide a combination toilet and chemical treating facility wherein means is provided for receiving waste materials, such as human waste materials, means is provided for reducing these materials to a finely-divided, fluent state and means is provided for treating the resulting finely-divided materials to destroy bacteria therein and to discharge the resulting treated material.

Yet another object of this invention is to provide in a compact unit means for receiving human waste materials and discharging the same into a treating chamber wherein means is provided for treating these materials therein to destroy any bacteria and to remove offending odors and then to discharge the resulting treated materials.

How these and other objects of this invention are accomplished will become apparent in the light of the accompanying drawings wherein:

FIG. 5 is a cross-sectional, plan view taken along line 5—5 of FIG. 3; and wherein FIG. 6 is a cross-sectional, side elevational view of a piston pump useful in the apparatus of this invention.

Figure 1:
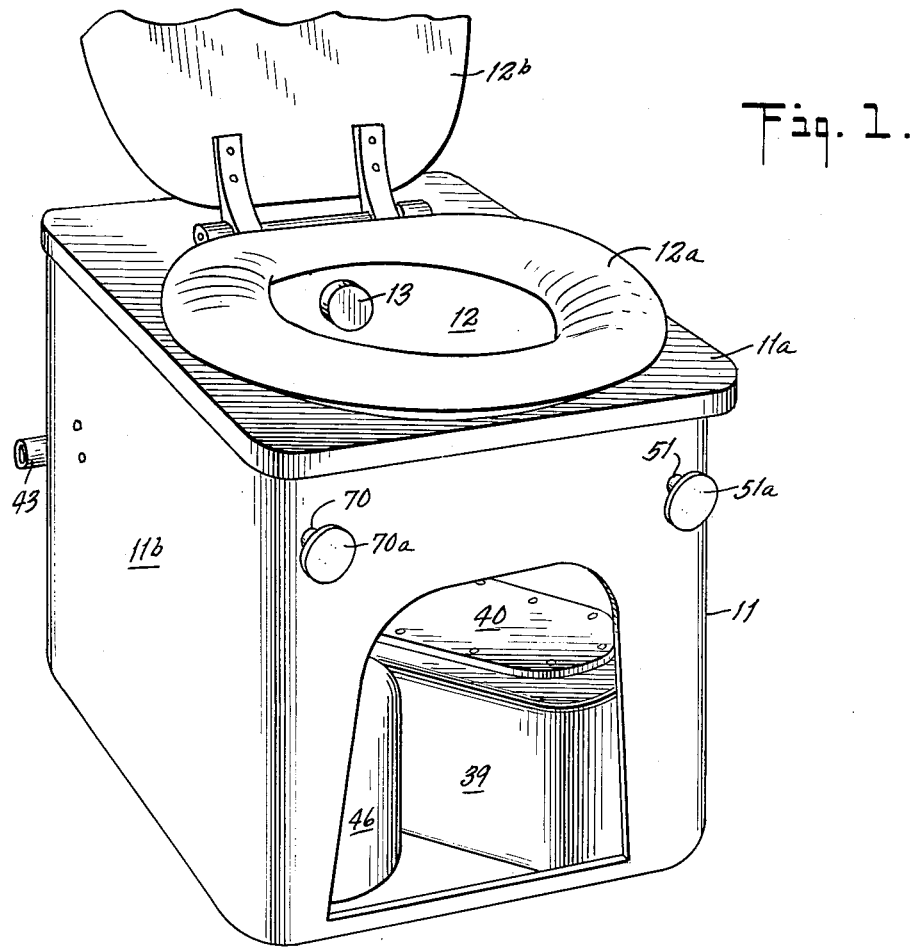
FIG. 1 is a perspective view of a combination toilet and chemical treating facility in accordance with this invention, showing the location of certain major components thereof.
Figure 2:
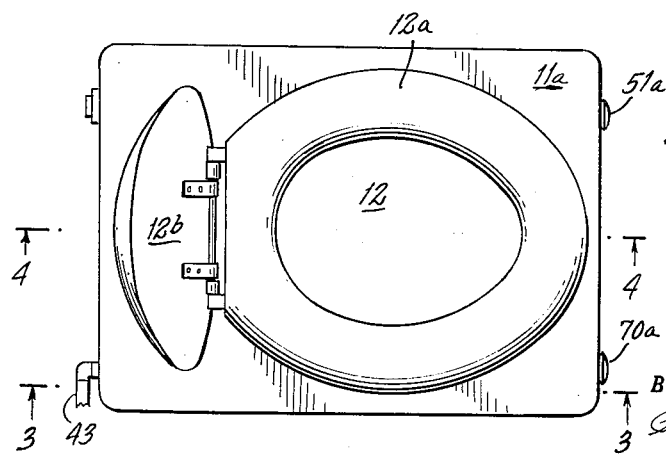
FIG. 2 is a plan view of the combination toilet and chemical treating facility in accordance with this invention, showing in outline the location of certain major components thereof.

In accordance with this invention there is provided in a combination toilet and chemical treating unit, such as a chlorinator, means capable of receiving waste material, such as solid human waste materials, means for reducing waste material to a finely-divided, fluent state, means for mixing or contacting said waste material with a chemical treating agent, such as a chlorine-containing material, e.g., aqueous sodium hypochlorite solution, means for holding the resulting treated admixture for a period of time to permit chemical treatment of the finely-divided waste materials and for discharging the resulting chemically treated materials.

More particularly, in accordance with this invention, there is provided a combination toilet and chlorinator facility capable of receiving waste, such as solid human waste materials, mixing therewith an effective dosage of a chemical treating or disinfecting agent, such as an aqueous solution of sodium hypochlorite (Clorox), reducing solid wastes in the presence of said chemical treating agent to a finely-divided, fluent state by high speed maceration, holding the resulting treated waste and attendant liquids in contact with the chemical treating agent for a sufficient period of time to obtain a satisfactorily treated waste, such as in the case of treatment of human waste materials, a satisfactory reduction of coliform bacteria therein, and discharging the resulting treated waste, preferably at a pressure sufficient to permit its discharge below the surface of a receiving body of water.

The combination toilet and chemical treating facility in accordance with this invention comprises a toilet or specially shaped receptacle or bowl with attendant standard seat and lid combination, means for dispensing or introducing fluids, such as water or a chemical treating agent or admixtures thereof into said bowl, a dump valve provided in association with the discharge opening of said bowl to permit the retention of the bowl contents or the discharge of the bowl contents into a maceratingpumping chamber, said chamber being provided with means therein for reducing solid materials introduced thereinto to a finely-divided, fluent state in the presence of the introduced fluids, such as chemical treating agent, and a retention tank in fluid communication with the discharge opening of said chamber wherein the resulting finely-divided, chemically treated materials are retained for a period of time to effect satisfactory chemical treatment of these materials before discharge. More particularly, in the combination toilet-chemical treating facility in accordance with this invention, means are provided effective upon discharge of waste materials in admixture with a chemical treating agent from the bowl for the maceration of these waste materials in the presence of the chemical treating agent to a finely-divided, fluent state, means being also provided effective simultaneously with the maceration of the waste materials within the macerating chamber for pumping macerated materials into a retention tank or chamber to complete the chemical treatment of these materials prior to discharge.

Referring now to the drawings, there is illustrated a combination toilet and chemical treating facility including a housing 11 provided with a toilet bowl 12 and standard combination seat 12a and hinged cover 12b. The cover 11a of housing 11 has an opening therethrough conforming to the outside shape of the upper portion of bowl 12. Toilet bowl 12 is provided at its upper inside portion with a fluid dispensing nozzle 13 and at the lower end or bottom with discharge opening 14 for discharge of the bowl contents via valve body 15 positioned adjacent and in direct fluid communication with the discharge opening 14. Upon the opening of clapper-type dump valve 16 the bowl contents are discharged through valve body 15 into the upper portion of macerating-pumping chamber 18 through its side flanged opening 18a.

A sleeve 19 made of suitable resilient material such as rubber provides a fluid-tight seal between the discharge opening 14 of toilet bowl 12 and valve body 15, sleeve 19 being fastened in a fluid-tight fit to discharge opening 14 and valve body 15 by clamping means or bands 20. Valve body 15 is provided with a flanged opening 21 at one end thereof for communication with and connection by means of flange 21a to flange 22 of opening 18a of macerating-pumping chamber 18. A fluid-tight seal between flanges 21a and 22 is provided by inserting suitable gasket material 24, such as neoprene or rubber, therebetween.

Centrally and axially disposed within macerating-pumping chamber 18 is shaft 25 which is fitted with cutting blades 26 to reduce solid materials discharged into macerating-pumping chamber 18 from bowl 12 upon the opening of valve 16. Cutting blades 26 are held on shaft 25 between rubber friction discs 28 to prevent damage to shaft 25 and blades 26 in the event blades 26 strike a hard object. Fine chopping-pumping blades 29 are mounted for rotation at the lower end of shaft 25. Shaft 25, at a position intermediate macerating blades 26 and chopping-pumping blades 29, is steadied by spider bearing 30 to prevent shaft 25 from whipping during rotation, shaft 25 being operatively connected to and rotated by high speed motor 31 positioned above shaft 25 and connected to the upper end thereof. As illustrated, high speed motor 31 is provided with suitable electric power leads 32.

Figure 3:
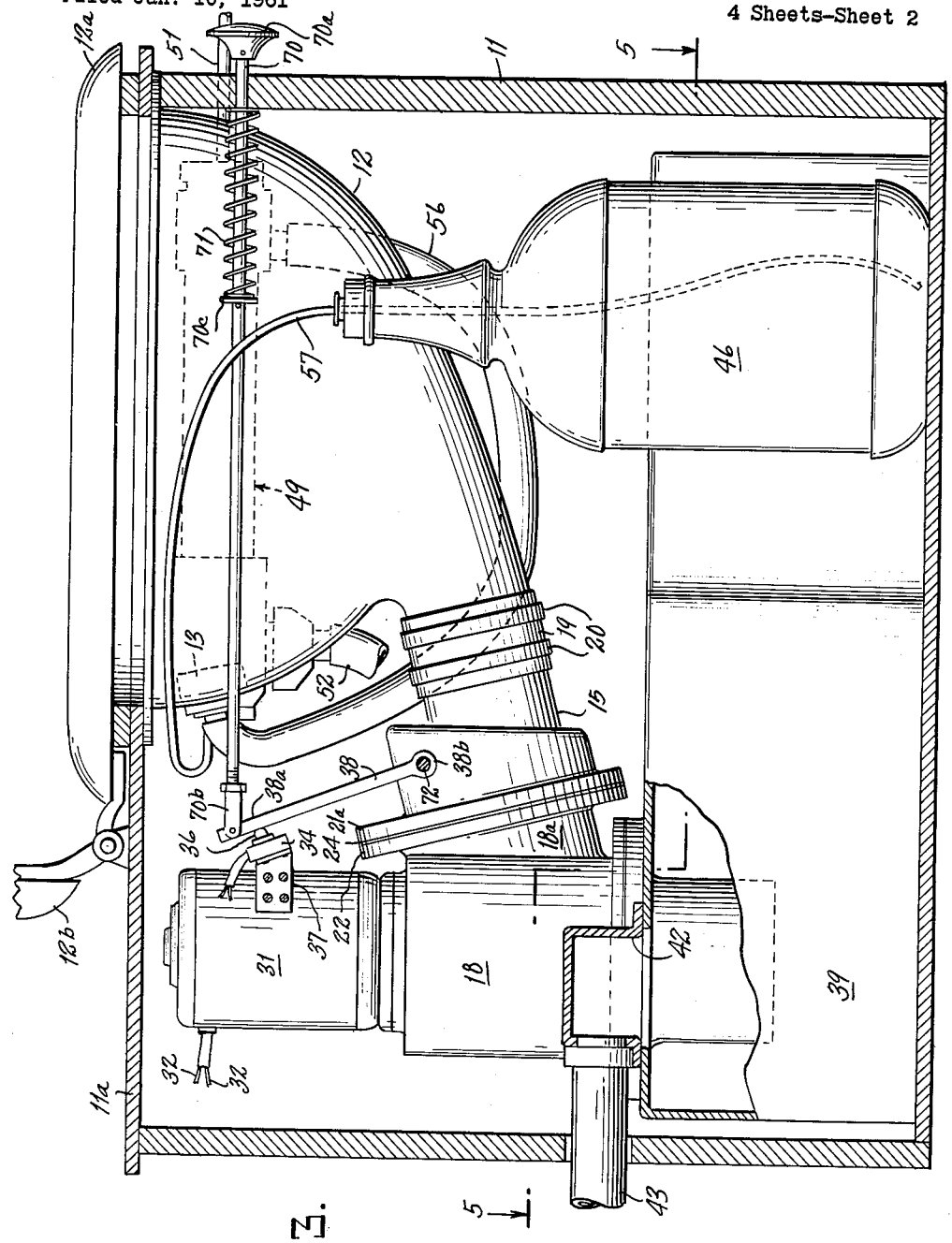
FIG. 3 is a cross-sectional, side elevational view taken along line 3—3 of FIG. 2.
Figure 4:
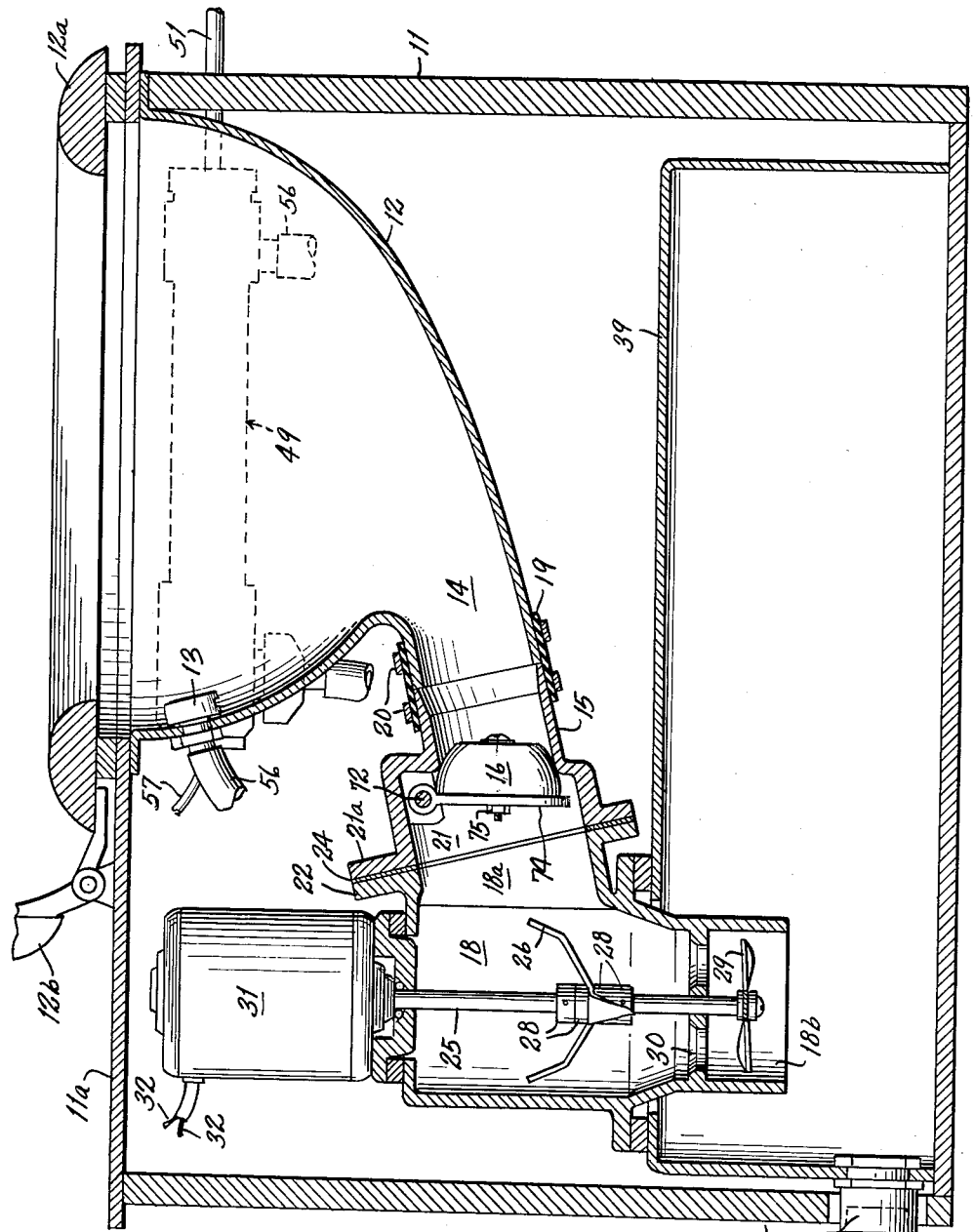
FIG. 4 is a cross-sectional, side elevational view taken along line 4—4 of FIG. 2.

Motor 31 is operated by motor switch 34, shown in FIG. 3. Motor switch 34 is adjustably mounted on bracket 37 which, in turn, is adjustably mounted by means not shown on the inside of housing 11 to side wall 11b. Switch button 36 of switch 34 is maintained depressed by contact with lever 38 when lever 38 is in the position shown in FIG. 3. Switch 34 is in the normally closed or "on" position when switch button 36 is not depressed or held in the switch "off" position by lever 38.

The upper end 38a of lever 38 is pivotally fixed by means of a clevis-pin arrangement 70b to one end of rod 70, the other end of which is provided with knob 70a. As illustrated in FIG. 3 lever 38 is maintained in position to contact and depress 36 of switch 38 into switch "off" position under the urging of spring 71 which bears against the front wall of housing 11 and collar 70c fixed to rod 70. The lower end 38b of lever 38 is fixed to pin 72 which extends through and into valve body 15 and is fixed therein to holding ring or plate 74 to which valve 16 is secured by means of nut and bolt 75.

The effluent from macerating-pumping chamber 18, which at its upper end portion surrounding cutting blades 26 is substantially elliptically shaped, leaves from bottom opening 18b and is directly discharged into treating tank 39 positioned therebelow which serves to support upper macerating-pumping chamber 18 and attendant facilities.

Treating tank 39 is provided with removable cover 40 which partially covers the top of tank 39. Tank 39 is also provided with an internal baffle 40 to prevent short circuiting of the effluent waste pumped from macerating-pumping chamber 18 via outlet 18b thereof to outlet 42 provided at the top of tank 39. An outlet conduit 43 is provided through an opening in the rear of housing 11 connected to outlet 42 for the flow of treated effluent from treating tank 39 for discharge to a suitable location or body of water. A clean-out plug 45 is also provided in the bottom of the rear of housing 11 and treating tank 39 for intermittent cleaning and flushing of the interior of treating tank 39 as may be required for satisfactory operation.

Chemical treating container 46 is disposed within the interior of housing 11 and serves to store the chemical treating agent, such as an aqueous soltuion of sodium hypochlorite (Clorox) having an available chlorine content of about 5–6%. Container 46 has a capacity of about one-half gallon, more or less, as may be desired and treating tank 39 has a capacity at least equivalent to a minimum of four times the average flush volume per toilet use, more or less, as may be required or desired. Desirably, as shown in the drawing, container 46 is the orginal glass container in which the chemical treating agent, aqueous sodium hydrochlorite, is sold.

A hand operated flush pump 49 is provided within housing 11 and positioned therein, as illustrated, by means of brackets or suitable supports, not shown, to the inside of cover 11a. Flush pump 49, shown in detail in FIG. 6 of the drawings, is manually operated by rod 51 which is provided with handle or knob 51a at the outside end thereof. Flush pump 49 is supplied at the intake end with fresh water from a suitable source via conduit 52 which is connected to pump inlet 54, and is provided at the discharge end with discharge outlet 55 to which is fitted discharge conduit 56 for the supply of flushing water admixed with chemical treating agent to bowl 12 via nozzle 13 provided within the interior and at the back portion of bowl 12. Pump 49 is also provided with a secondary inlet which is supplied with chemical treating agent from container 46 via conduit 57.

Referring now to FIG. 6 of the drawings which illustrates in detail pump 49, pump 49 comprises a cylinder 58 provided with a discharge outlet 55 at one end and primary inlet 54 at the other end. Piston 59 provided with a skirt of suitable resilient material 60 around the periphery thereof is operative in piston-cylinder relationship within cylinder 58. Piston rod 51 is fixed to piston 59, one side portion thereof extending through cylinder closure 61 and fitting 62 located at that end of cylinder 58 adjacent cylinder discharge outlet 55 and the other side portion 51b of piston rod 51 fixed to piston 59 terminates within cylinder 58 at that end thereof adjacent cylinder inlet 54.

A plate 64 is fixed to the other end of cylinder 58 as a closure. Plate 64 is provided with an opening 65 therethrough to communicate with cylinder orifice inlet 66. Cylinder orifice inlet 66 is provided with an opening 66a therethrough and with one way check valve 68 made of suitable material, substantially inert to the chemical treating fluid employed. A washer 67 made of suitable resilient material such as plasticized polyvinyl chloride is positioned between cylinder orifice inlet 66 and plate 64. As illustrated in FIG. 6 cylinder inlet 54 is also provided with one way check valve 69.

In the operation of the pump 49, knob 51a of piston rod 51 is pulled forward so that piston 59 moves within cylinder 58 in the direction of cylinder discharge outlet 55. Any liquid within cylinder 58 intermediate piston 59 and discharge outlet 55 is forced from cylinder 58 and discharged therefrom via discharge outlet 55 and conduit 56.

As piston 59 is thus moved one way check valves 68 and 69 open and permit the flow of fluids into cylinder 58, the chemical treating fluid entering cylinder 58 via orifice inlet 66, opening 66a and then through washer 67 and opening 65 in plate 64, the flush water enters cylinder 58 via inlet conduit 52 and cylinder inlet 54. Upon the return stroke of piston rod 51 so that piston 59 moves in the direction of cylinder inlet 54 the fluids taken into cylinder 58 via inlets 66 and 54 are caused to move around the outer periphery of piston 59 due to the deflection of resilient material 60 provided around a periphery of piston 59, one way check valves 68 and 69 being closed. At the completion of the return stroke of piston 59 the end of side portion 51b of piston rod 51 enters washer 67 to plug the opening therethrough. With the end of side portion 51b of piston rod 51 so positioned siphoning or draining of chemical treating fluid supplied via orifice inlet 66 through check valve 68 and orifice 65 is prevented.

By adjusting the size of opening 66a of orifice inlet 66 with respect to the size of inlet 54 the desired proportion of chemical treating fluid, aqueous sodium hypochlorite, supplied via conduit 57 from container 46, to water upon operation of pump 49 can be obtained. It has been found that 2 volumes of 5–6% aqueous sodium hypochlorite, e.g. (Clorox), per 150 volumes of water yield satisfactory results when employed in the practice of this invention.

In the operation of the combination toilet-chemical treating facility apparatus of this invention, with valve 16 which is made of suitable resilient inert material, such as rubber, being in the normally closed position to provide a substantially odor-tight seal at the discharge outlet 14 of bowl 12, bowl 12 is partially filled with water and chemical treating solution by a few strokes of operating handle 51 of pump 49. After bowl 12 has been partially filled with fresh water and chemical treating agent and after use, the contents thereof are dumped by grasping knob 70a and pulling forward rod 70 to about its extreme forward position. Actuating rod 70 is pulled forward and held at its extreme forward position until the contents of bowl 12 have been emptied into macerating-pumping chamber 18. If desired, additional flush water may at the same be supplied to bowl 12 by manually operating pump 49.

Movement of actuating rod 70 to its extreme forward position rotates lever 38 through its full arc of swing, pivoting about pivot rod or pin 72 which is also simultaneously rotated about its longitudinal axis. Upon rotation of lever 38 and pin 72 two operations are accomplished simultaneously; (1) pin 72 is rotated thereby opening dump valve 16 which is operatively fixed to a portion of pin 72 by means of holding ring or plate 74, (2) lever 38 is moved away from switch 34 and switch button 36 is released, turning switch 34 to the normal or "on" position thereby operating motor 31 to start the macerating-pumping action of blades 26 and 29 upon the bowl contents as the contents enter macerating-pumping chamber 18.

As the bowl contents enter macerating-pumping chamber 18 any solid material is macerated by macerating blades 26. Blade shape and edge sharpness, size and path of whirling tips of blades 26 are all chosen in close relationship with respect to the walls of macerating chamber 18 to provide maximum macerating action. The macerated solid contents fall downwardly within macerating chamber 18 into contact with fine chopping-pumping blades 29 which further subdivide any solid material therein. As indicated, the fine chopping-pumping blades 29 are pitched and act as a propeller to provide a pumping action to pump and drive the resulting treated effluent into tank 39 positioned directly below and encompassing the bottom opening 18b of macerating-pumping chamber 18. The leading edges of blades 29 are sharpened and the small clearances between the leading and trailing edges of adjacent blades or vanes and between the outer ends of the blades and the wall surfaces of macerating-pumping chamber 18 provide for effecting pumping action in addition to a finer chopping of any solid particles passing therethrough.

The resulting chopped and pumped effluent passes within and through treating tank 39 around baffle 40 therein and is discharged therefrom via outlet 42 and conduit 43. The pumping action effected by chopping-pumping blades 29 is sufficient to cause the discharge of the fluid contents, normally completely filling treating tank 39, from tank 39 via outlet conduit 42 and discharge line 43, even when discharge line 43 opens into and is immersed in a receiving body of water. The discharge of treated effluent from tank 39 occurs as additional chopped effluent is moved by blades 29 from chamber 18 into treating tank 39 thereby displacing therefrom an equivalent volume of treated effluent.

When the bowl contents have been emptied from bowl 12, rod 70 is released and spring 71 returns lever 38 to its original, normal position and closes dump valve 16. When spring 71 returns lever 38 to its original, normal position button 36 is depressed to the "off" position by lever 38.

In accordance with another embodiment of this invention the entire flushing action or introduction of water and chemical treating fluid into the bowl could be made more easy by substitution of a motor-driven pump for hand operated pump 49. Moreover, if the motor-driven pump is also electrically connected to the motor switch the motor-driven pump could feed flush water to the bowl automatically and continuously as the bowl discharge and chopping and pumping operations are carried out.

The installation and arrangement and positions of the component parts of the combination toilet-chemical treating facility can be varied within housing 11 without departing from the scope of this invention providing the component parts are assembled and arranged and disposed cooperatively as described and illustrated herein to perform the desired and required functions of, during the bowl dumping operation, simultaneously macerating the dumped bowl contents, chemically treating the same by directly admixing the chemical treating liquid therewith during the macerating operation, and pumping away the resulting macerated, chemically treated effluent, and of, during the bowl closing operation when the dump valve is returned to seal-off the bowl discharge opening, stopping the macerating and pumping operations and the discharging or admixing of the chemical treating liquid into the macerating chamber.

Although in the description of this invention made with reference to the accompanying drawings emphasis has been placed on the installation of the apparatus of this invention in marine craft, particularly small marine craft, it is pointed out that the apparatus of this invention is generally applicable wherever a compact, light-weight combination toilet and chemical treating facility is desirable, such as in trailers, aircraft, vacation cottages, portable structures, railroad cars, etc.

As will be apparent to those skilled in the art in the light of the accompanying disclosure, many modifications, changes and substitutions are possible in the practice of this invention without departing from the spirit or scope thereof.

I claim:

A marine toilet comprising in a unitary structure, a toilet bowl provided with a bottom outlet, a macerating chamber communicating with said bowl via said bottom outlet, a holding chamber in fluid communication with the bottom of said macerating chamber, said holding chamber being provided with a chamber outlet, means for dispensing fluid to said bowl, macerating means provided within said macerating chamber, pumping means provided within said macerating chamber for moving fluid from said macerating chamber through the bottom thereof to said holding chamber and for discharging fluid from said holding chamber via said chamber outlet, a value operative in cooperation with said bottom outlet to open or shut off flow of fluid from said bowl via said bottom outlet to said macerating chamber and common means operative to open or close said valve and to operate said macerating means and said pumping means all substantially simultaneously when said valve is opened, said common means comprising an electric motor operatively connected both to said macerating means and said pumping means, a motor switch operatively connected to said motor, and a lever adapted for movement into and out of contact with said motor switch to operate said motor when said lever is moved out of contact with said switch, said lever being fixed to said valve so that upon movement of said lever said valve is moved into or out of engagement with said bottom outlet and said lever being disposed and arranged with respect to said switch and said valve so that as said lever is moved out of contact with said switch said valve is substantially simultaneously opened.

References Cited in the file of this patent

UNITED STATES PATENTS

| | | | |
|---|---|---|---|
| 1,277,383 | Cherry | Sept. 3, | 1918 |
| 1,329,932 | Sell et al. | Feb. 3, | 1920 |
| 1,757,514 | Coulombe | May 6, | 1930 |
| 1,996,325 | Cox | Apr. 2, | 1935 |
| 2,249,739 | Brownell et al. | July 22, | 1941 |
| 2,718,012 | Howe | Sept. 20, | 1955 |
| 2,946,065 | Smith | July 26, | 1960 |